United States Patent
Kaiser et al.

[15] 3,674,792
[45] July 4, 1972

[54] 1-(BENZOHETEROCYCLIC CYCLOPROPYLMETHYL)-4-PHENYL-4-PIPERIDINOLS

[72] Inventors: Carl Kaiser, 1105 Sylvan Drive, Haddon Heights, N.J. 08035; Charles L. Zirkle, 373 Beechwood Road, Berwyn, Pa. 19312

[22] Filed: July 16, 1970

[21] Appl. No.: 62,763

[52] U.S. Cl. ............... 260/293.57, 260/293.58, 260/293.61, 260/294.8 C, 424/263
[51] Int. Cl. ........................................................ C07d 29/36
[58] Field of Search .................. 260/293.57, 293.58, 293.61

[56] References Cited

OTHER PUBLICATIONS

C. A. 69:106553 X Nakanishi et al. (1968)

Primary Examiner—Henry R. Jiles
Assistant Examiner—S. D. Winters
Attorney—William H. Edgerton, Richard D. Foggio, Joan S. Keps, Arthur R. Eglington, Alan D. Lourie and Joseph A. Marlino

[57] ABSTRACT

1-(Benzoheterocyclic cyclopropylmethyl)-4-phenyl-1,2,5,6-tetrahydropyridines in which the benzoheterocyclic moiety is 2- or 3-thianaphthenyl, benzofuryl or indolyl and said moiety and/or the phenyl groups may be substituted by chloro, bromo, fluoro, methyl, methoxy or trifluoromethyl have central nervous system depressant and neuroleptic activity. The compounds are generally prepared from a benzoheterocyclic cyclopropanecarboxylic acid via the acid chloride or the lower alkyl mixed anhydride by condensation with a 4-phenyl-4-piperidinol to give a corresponding amide. The amide is reduced to the cyclopropylmethyl derivative which is dehydrated with acid to the tetrahydropyridine product. The amides and cyclopropylmethyl derivatives are useful intermediates.

10 Claims, No Drawings

1-(BENZOHETEROCYCLIC CYCLOPROPYLMETHYL)-4-PHENYL-4-PIPERIDINOLS

This application is a division of application, Ser. No. 767,840 filed Oct. 15, 1968, now U.S. Pat. No. 3,546,236.

This invention relates to novel 1-(benzoheterocyclic cyclopropylmethyl)-4-phenyl-1,2,5,6-tetrahydropyridines which have useful pharmacodynamic activity. More specifically the compounds of this invention have central nervous system depressant and neuroleptic activity as demonstrated in standard animal pharmacological test procedures. Exemplary of the activity of the compounds of this invention is the decrease in spontaneous motor activity, ptosis, hypotonia and hypothermia produced in rats upon oral administration of 25–100 mg/kg.

The compounds of this invention are represented by the following general structural formula:

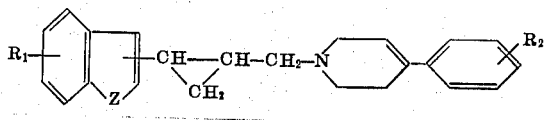

FORMULA I in which:

$R_1$ and $R_2$ each represent hydrogen, chloro, bromo, fluoro, methyl, methoxy or trifluoromethyl; and Z represents oxygen, sulfur or imino (NH). Thus the invention relates to compounds wherein the benzoheterocyclic moiety is a thianaphthene, benzofuran or indole ring. Preferably this moiety is 3-substituted.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicyclic, methanesulfonic, ethanedisulfonic, acetic, oxalic, propionic, tataric, salicyclic, citric, gluconic, lactic, malic, mandelic, cinnamic, citraconic, aspartic, stearic, palmitic, itaconic, glycolic, p-aminobenzoic, glutamic, benzenesulfonic, hydrochloric, hydrobromic, sulfuric, sulfamic, phosphoric and nitric acids.

The compounds of this invention may be present as cis-trans isomers due to the configuration about the cyclopropane ring and further as $d,l$ optical isomers. Unless otherwise specified in the description and accompanying claims, it is intended to include all isomers, whether separated or mixtures thereof.

The compounds of this invention are 1, 2from benzoheterocyclic cyclopropanecarboxylic acids having the formula:

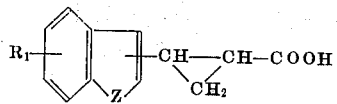

FORMULA II wherein $R_1$ and Z are as defined above, which are prepared as described in U.S. Pat. No. 3,010,971. The acids of formula II are converted to the products of this invention by treatment with thionyl chloride to give the corresponding acid chloride which is reacted with a 4-($R_2$-substituted phenyl)-4-piperidinol to give a benzoheterocyclic cyclopropanecarboxamide having the formula:

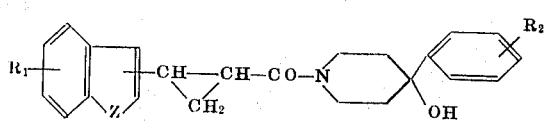

FORMULA III wherein $R_1$, $R_2$ and Z are as defined above. The amide of formula III is reduced with lithium aluminum hydride to give the corresponding cyclopropylmethyl compound which is dehydrated with acid such as a mineral acid, for example hydrochloric acid, to yield the 1,2,5,6-tetrahydropyridine product, Alternatively, the acids of Formula II above are reacted with a lower alkyl haloformate, preferably ethyl chloroformate, in the presence of a tertiary amine such as triethyl amine to give the corresponding cyclopropyl mixed anhydride. The anhydride is then treated with a 4-($R_2$-substituted phenyl)-4-piperidinol to give the cyclopropanecarboxamide of Formula III above which is similarly reduced and dehydrated to the products of Formula I.

The 4-($R_2$-substituted phenyl)-4-piperidinol starting materials used as described above are either known or are prepared by standard procedures.

The compounds of this invention may be administered orally or parenterally in conventional dosage unit forms such as tablets, capsules, injectables or the like, by incorporating the appropriate dose of a compound of Formula I, either as the free base or an acid addition salt thereof, with carriers according to accepted pharmaceutical practices.

The foregoing is a general description of how to prepare the compounds of this invention. The following examples illustrate the preparation of specific compounds having central nervous system depressant and neuroleptic activity. However this should not be construed as limiting the starting materials, for example employing a corresponding cis or trans cyclopropanecarboxylic acid, will produce other products set forth hereinabove.

EXAMPLE 1

A solution of 6.9 g. (0.0315 m.) of 2-(3-thianaphthenyl)-cyclopropanecarboxylic acid in acetone and water is stirred at room temperature while 3.82 g. (0.0315 m.) of triethylamine in acetone is added. The resulting solution is cooled to −5° C. and a solution of 3.42 g. (0.0315 m.) of ethyl chlorofromate in acetone is added dropwise. The mixture is allowed to warm to room temperature, 5.58 g. (0.0315 m.) of 4-phenyl-4-piperidinol in acetone is added and the resulting mixture is stirred and refluxed for three hours. After standing overnight at room temperature the reaction mixture is filtered and the residue obtained from the filtrate is triturated with methylene chloride. The methylene chloride filtrate is washed with water, dilute acid and base, dried and evaporated to give 1-[2-(3-thianaphthenyl)-cyclopropanoyl]-4-phenyl-4-piperidinol, m.p. 166°–168° C.

To a mixture of 1.0 g. of lithium aluminum hydride in 50 ml. of ether is added a suspension of 2 g. (0.00533 m.) of the above prepared 4-piperidinol in 200 ml. of ether, with stirring and cooling. The resulting mixture is stirred and refluxed for one hour, decomposed as usual, filtered and the filtrate evaporated. The residue is dissolved in ether, washed with sodium chloride solution, dried and evaporated to give 1-[2-(3-thianaphthenyl)-cyclopropylmethyl]-4-phenyl-4-piperidinol, m.p. 199°–200° C.

A suspension of 1.5 g. (0.00376 m.) of the above prepared cyclopropylmethyl compound in 30 ml. of concentrated hydrochloric acid is refluxed for three hours. The reaction mixture is filtered and the solid recrystallized from ethanol to yield 1-[2-(3-thianaphthenyl)-cyclopropylmethyl]-4-phenyl-1,2,5,6-tetrahydropyridine hydrochloride, m.p. 243°–244° C.

The corresponding free base is obtained by treatment with dilute base, extraction into ether and removal of the dried solvent. Further reaction of the liberated free base with acids as described hereinbefore yields other acid addition salts.

EXAMPLE 2

Following the procedures of Example 1, 2-(3-thianaphthenyl)-cyclopropanecarboxylic acid is converted to its triethylamine salt, reacted with ethyl chloroformate and the resulting anhydride is condensed with 4-(p-chlorophenyl)-4-piperidinol to give the amide which is reduced with lithium aluminum hydride and dehydrated with acid to yield 1-[2-(3-thianaphthenyl)-cyclopropylmethyl]-4-(p-chlorophenyl)-1,2,5,6-tetrahydropyridine.

Similarly, by employing 4-(p-tolyl)-4-piperidinol or 4-(p-trifluoromethylphenyl)-4-piperidinol in the above described reaction sequence there are obtained 1-[2-(3-thianaphthenyl)-cyclopropylmethyl]-4-(p-tolyl)-1,2,5,6-tetrahydropyridine or 1-[2-(3-thianaphthenyl)-cyclopropylmethyl]-4-(p-trifluoromethylphenyl)-1,2,5,6-tetrahydropyridine, respectively.

EXAMPLE 3

Following the procedures of Example 1, 2-(3-indolyl)-cyclopropanecarboxylic acid triethylamine salt is reacted with ethyl chloroformate and 4-phenyl-4-piperidinol is added to the resulting anhydride to give 1-[2-(3-indolyl)-cyclopropanoyl]-4-phenyl-4-piperidinol which is reduced with lithium aluminum hydride to give 1-[2-(3-indolyl)-cyclopropylmethyl]-4-phenyl-4-piperidinol. The latter is dehydrated with acid to yield 1-[2-(3-indolyl)-cyclopropylmethyl]-4-phenyl-1,2,5,6-tetrahydropyridine.

EXAMPLE 4

Following the procedures of Example 1, 2-(3-benzofuryl)-cyclopropanecarboxylic acid is converted to its triethylamine salt and reacted with ethyl chloroformate to give the mixed anhydride. The latter is reacted with 4-(m-bromophenyl)-4-piperidinol to give 1-[2-(3-benzofuryl)-cyclopropanoyl]-4-(m-bromophenyl)-4-piperidinol which is reduced with lithium aluminum hydride to 1-[2-(3-benzofuryl)-cyclopropylmethyl]-4-(m-bromophenyl)-4-piperidinol. Treatment of the latter piperidinol with concentrated hydrochloric acid yields 1-[2-(3-benzofuryl)-cyclopropylmethyl]-4-(m-bromophenyl)-1,2,5,6-tetrahydropyridine.

Use of 4-(o-tolyl)-4-piperidinol in the above procedure results in the formation of 1-[2-(3-benzofuryl)-cyclopropylmethyl]-4-(o-tolyl)-1,2,5,6-tetrahydropyridine.

Use of methoxy or fluoro substituted phenylpiperidinols yields the corresponding methoxy of fluoro substituted products.

EXAMPLE 5

Following the procedures of Example 1,2-(5-chloro-thianaphthen-3-yl)-cyclopropanecarboxylic acid triethylamine salt is reacted with ethyl chloroformate and 4-(p-fluorophenyl)-4-piperidinol is added to the resulting anhydride to give 1-[2-(5-chlorothianaphthen-3-yl)-cyclopropanoyl]-4-(p-fluorophenyl)-4-piperidinol. This amide is reduced with lithium aluminum hydride to 1-[2-(5-chlorothianaphthen-3-yl)-cyclopropylmethyl]-4-(p-fluorophenyl)-4-piperidinol which is dehydrated to yield 1-[2-(5-chlorothianaphthen-3-yl)-cyclopropylmethyl]-4-(p-fluorophenyl)-1,2,5,6-tetrahydropyridine.

EXAMPLE 6

By following the procedures of Example 1, further 4,5,6 or 7 $R_1$-substituted thianaphthen-2-yl, thianaphthen-3-yl, benzofur-2-yl, benzofur-3-yl, indol-2-yl or indol-3-yl cyclopropanecarboxylic acids, prepared as described in U.S. Pat. No. 3,010,971, are reacted via the ethyl mixed anhydride with 4-($R_2$-substituted phenyl)-4-piperidinols to give corresponding amides which are reduced with lithium aluminum hydride and then dehydrated to the 1,2,5,6-tetrahydropyridine products.

What is claimed is:

1. A chemical compound of the formula:

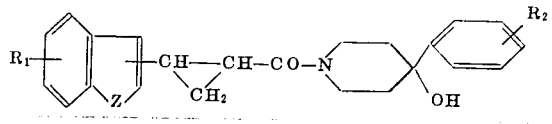

wherein:
$R_1$ and $R_2$ are each hydrogen, chloro, bromo, fluoro, methyl, methoxy or trifluoromethyl; and
Z is oxygen, sulfur or imino.

2. A chemical compound of the formula:

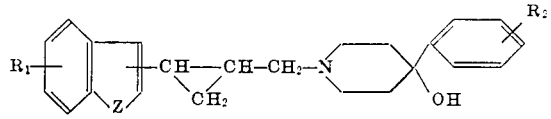

wherein:
$R_1$ and $R_2$ are each hydrogen, chloro, bromo, fluoro, methyl, methoxy or trifluoromethyl; and
Z is oxygen, sulfur or imino.

3. A chemical compound according to claim 1 in which the benzoheterocyclic moiety is 3-substituted.

4. A chemical compound according to claim 3 in which Z is sulfur.

5. A chemical compound according to claim 3 in which Z is oxygen.

6. A chemical compound according to claim 3 in which Z is imino.

7. A chemical compound according to claim 2 in which the benzoheterocyclic moiety is 3-substituted 8. A chemical compound according to claim 7 in which Z is sulfur.

9. A chemical compound according to claim 7 in which Z is oxygen.

10. A chemical compound according to claim 7 in which Z is imino.

* * * * *

PO-1050
(5/69)

UNITED STATES PATENT OFFICE
CERTIFICATE OF CORRECTION

Patent No. 3,674,792          Dated July 4, 1972

Inventor(s) Carl Kaiser and Charles L. Zirkle

It is certified that error appears in the above-identified patent and that said Letters Patent are hereby corrected as shown below:

On the face of the patent the assignee should be indicated as follows:

[73] Assignee: Smith Kline & French Laboratories, Philadelphia, Pa.

Signed and sealed this 12th day of December 1972.

(SEAL)
Attest:

EDWARD M. FLETCHER, JR.
Attesting Officer

ROBERT GOTTSCHALK
Commissioner of Patents